3,155,521
FEED GRAIN ADDITIVE AND METHOD OF
PREPARING SAME
George E. Ward and Steven N. Dereniuk, Newaygo,
Mich., assignors to Dawe's Laboratories, Inc., Chicago,
Ill., a corporation of Illinois
No Drawing. Filed Dec. 9, 1960, Ser. No. 74,775
14 Claims. (Cl. 99—2)

This invention relates to the incorporation of nutritionally active substances into animal feed, and more particularly relates to a process for the preparation of a dry particulate animal feed supplement from a nutritionally active substance which exists normally in the liquid state.

It is known to add liquids, such as oils or melted fats, to animal feed to overcome dustiness and to increase the energy content of the feed. Such oils or fats are usually added at levels of 2% to 10% of the weight of the feed, and it is not required that the oil or fat be perfectly distributed throughout the feed because these fatty substances do not perform a critical nutritional function. However, ingredients having such a function, such as vitamins, antioxidants, antibiotics, etc., are usually present in much smaller concentrations and uniform dispersion throughout the feed becomes critical.

Modern mixed feeds for poultry and livestock contain a variety of vitamins, antibiotics, hormones, pigmentation factors, trace minerals, and growth factors, all of which are necessary for good growth, health and productivity of the animals. To preserve the activity of some of these biologically-active materials in animal feeds so that the animals ingesting the feed will obtain their full benefit, antioxidants are added to the feed and to some of the premixes used in preparing the feed. Butylated hydroxy anisole and butylated hydroxy toluene are examples of solid antioxidants which have been so used in the past.

Recently, the antioxidant 6-ethoxy-1,2-dihydro-2,2,4-trimethylquinoline, supplied under the names "Santoquin" and "Ethoxyquin," has found favor as a protective agent for the carotene content of forage crops, and for the vitamin content of animal feeds. (In this specification the term "Santoquin" is used interchangeably with 6-ethoxy-1,2-dihydro-2,2,4-trimethylquinoline, and the two terms are to be regarded as equivalent.) This antioxidant is particularly effective in protecting the fat-soluble vitamins of feeds, such as vitamin A, vitamin D, vitamin E, and vitamin K. Santoquin has also been found to have a sparing action on the vitamin E requirements of poultry and to prevent the disorder "encephalomalacia" in poultry. It is thus apparent that Santoquin is a very desirable constituent of poultry and livestock feeds. Santoquin is usually employed in such feeds at concentrations in the range 0.002% to 0.20%.

Santoquin is a viscous, orange-brown liquid, of specific gravity 1.030 at 25° C., and boiling point 125° C. at 1–2 mm. pressure. It is insoluble in water but soluble in animal and vegetable oils and in a variety of organic solvents.

The high viscosity of Santoquin, together with the low concentrations at which this compound is used in animal feeds, make it extremely difficult to obtain a homogeneous, well-distributed mixture of liquid Santoquin with the solid constituents of poultry and livestock feed. Furthermore, many feed manufacturing plants, which combine numerous feed ingredients to produce finished feeds ready for consumption by animals, are not equipped with means for dispensing accurately-measured quantities of viscous liquids, such as Santoquin, to feed mixing equipment. Most feed-mixing operators prefer to add solid materials, rather than liquids, to their mixing equipment.

For the several above reasons, it is desirable that Santoquin be prepared in solid form prior to being used as an ingredient of animal feeds.

Economical warehousing, economical shipping, and efficient feed-mixing practices require that a Santoquin-containing solid composition for use in animal feeds should have a Santoquin concentration in the range of about 10% to about 70%, by weight. Experience has shown that it is not possible to prepare satisfactory solid products of such compositions from ingredients commonly used in the animal feed industry. For example, when more than about 6% to 8% of Santoquin is mixed with common materials of cereal origin, such as corn meal, soybean meal, barley meal, buckwheat feed, corn gluten feed, corn oil meal, linseed oil meal, and the like, the resulting mixtures appear glossy and greasy and the Santoquin "bleeds" out of the mixtures onto paper and cloth containers and leaves a greasy film on the surfaces of equipment used for mixing and conveying the Santoquin-cereal mixture. Obviously, compositions with these disadvantages are unsatisfactory for manufacture and use in the animal feed field.

It is therefore an object of this invention to convert a normally liquid substance to a mass in the solid state for the purpose of facilitating its handling, shipping, storage, and mixing with other solid materials.

It is a further object of this invention to convert normally oily and sticky constituents of animal feed to solid, dry materials which can be readily mixed in and dispersed evenly throughout animal feed composed of solid, particulate matter.

It is a further object of this invention to treat biochemically and biologically active substances which are normally liquids, in such a manner that they assume the form of discrete solid particulate matter which maintains and preserves the full biochemical and biological activity of the initial active material and makes it available for the preservation of animal feed components and for the nutrition and protection of animals ingesting said feed.

It is a further object of this invention to prepare a dry, particulate animal feed supplement from a nutritionally-active substance which exists normally in the liquid state.

These and other objects of this invention will appear more clearly when considering the following disclosure and claims.

We have found that dry Santoquin compositions containing the desired 10% to 70% of Santoquin and having desirable physical characteristics, such as being stable, non-bleeding, non-greasy, flowable, and easily distributed in feeds, can be prepared by combining certain vegetable materials and certain mineral powders with Santoquin in a certain way.

In the method of our invention, Santoquin is first mixed with a selected highly absorptive material of vegetable origin to form a semi-solid mass having oily or pasty characteristics to a degree which varies according to the proportions of vegetable-derived material and Santoquin employed, as will be later described. To this semi-solid oily or pasty mass there are then added measured amounts of a highly-absorptive powder of mineral origin, and the elements are mixed together to yield a dry composition which is entirely free from oily and greasy characteristics and which may be bagged, warehoused, transported, and used in animal feed mixing plants in the same manner as other solid feed components.

Materials of vegetable origin which are highly absorptive and therefore applicable to the method of our invention are the cereals or cereal by-products having a relatively high fiber content. The following list shows the fiber content of the materials which may be used as absorptive vegetable materials in our process.

| Vegetable material: | Percent fiber |
|---|---|
| Alfalfa stem meal | 36 |
| Buckwheat hulls | 44 |
| Corn cob meal | 33 |
| Cottonseed hulls | 48 |
| Lespedeza meal | 27 |
| Oat hulls | 33 |
| Peanut hulls | 70 |
| Rice hulls | 36 |
| Soybean mill feed | 28 |
| Sunflower seed meal | 30 |
| Dried beet pulp | 19 |
| Hempseed meal | 25 |

Vegetable materials containing at least 19% fiber are therefore suitable materials for use in our process, and the variety of suitable materials makes it possible to choose raw material which is available in abundance at various manufacturing locations throughout the country.

In contrast, the cereal materials which are not suitable for use in our invention contain less than about 19% fiber.

We have obtained particularly good results using finely ground oat hulls or oat mill by-product, which are supplied commercially by American Colloid Co., Skokie, Illinois, under the name "Cell-Flo," and by Quaker Oats Co., Chicago, Illinois, under the name "Q.O. Cellulose 20."

The absorptive vegetable materials should be ground, before use in our process, to pass a 20- or 30-mesh screen, and the major portion of the particles should be in the 40-mesh to 325-mesh range.

The absorptive mineral powders which are applicable to the method of our invention are characterized by the capability of removing oiliness from the Santoquin-vegetable material mixture and of uniformly dispersing the particles in the final mixture. Found particularly suitable are the natural and synthetic silicates of calcium and magnesium. Talc, which is finely ground natural magnesium silicate, may be employed. Also calcium silicate is applicable. We obtain particularly good results by employing as the absorptive mineral agent synthetic hydrated calcium silicate supplied under the designation "Micro-Cel." The Micro-Cel grades designated "A," "B," "C" and "E" are applicable, and we obtain especially good results by using Micro-Cel "E." These synthetic hydrated calcium silicates have a loose weight density in the range 4.5 to 14.5 lb. per cu. ft.; an absorption capacity in the range 220 to 560 expressed as the percent of weight of water or oil absorbed by the Gardner-Coleman test; a particle size such that from 92 to 99% of the material passes through a 325-mesh screen; a specific gravity in the range 2.20 to 2.45, a refractive index in the range 1.52 to 1.55; a surface area in the range 95 to 175 square meters per gram; and an average particle size diameter in the range 0.02 to 0.04 micron.

The mixing of the described ingredients to produce the composition of our invention may be conducted at ordinary room temperatures and at atmospheric pressure. The vegetable and mineral ingredients may be used in the form in which they appear in commerce, requiring no special treatment to prepare them for use in the method of our invention, except for the grinding of the vegetable material to the indicated fineness.

The composition of our invention contains from 10 to 70% Santoquin, from about 1 to 88% absorptive vegetable matter, and from about 2 to 30% absorptive mineral powder. (All proportions are expressed as parts by weight.) The proportions of the ingredients used will vary somewhat according to the concentration of Santoquin desired in the product. A 10% Santoquin product will advantageously contain about 80 to 88% of absorptive vegetable material and about 2 to 10% of absorptive mineral powder. A 25% Santoquin product will advantageously contain about 55 to 70% absorptive vegetable material and about 5 to 20% of absorptive mineral powder. A 50% Sentoquin product will advantageously contain about 20 to 42% of absorptive vegetable materal and about 8 to 30% of absorptive mineral powder. A 70% Santoquin product will advantageously contain about 1 to 20% of absorptive vegetable material and about 10 to 29% of absorptive mineral powder.

The proportions of absorptive vegetable material and of absorptive mineral powder are selected so that the final product will have desirable physical characteristics. Thus, the final product should be dry and flowable, but it should not be dusty. Dustiness results if too high a proportion of mineral powder is present. Fluffiness, poor flowability, or a greasy appearance may result if too high a proportion of absorptive vegetable material is employed. The mineral powder overcomes the oiliness, stickiness, or pastiness of the Santoquin-vegetable material mixture, and more mineral powder is usually required to make products with a high Santoquin content than is required to make products with a low Santoquin content.

The added mineral powder has both a drying action on the oily Santoquin-vegetable material mixture, and a dispersing action on the particles which are formed after the oiliness is overcome. Because of these two functions, it is sometimes desirable to add the mineral powder in two or more increments instead of all at one time. The first increments of mineral powder which are mixed with the oily mass serve to dry it, and to allow it to break up into discrete particles; the subsequent increments disperse these dry particles to give a flowable, well-distributed product with stable physical characteristics which are desirable for packaging, storing and subsequent blending with other feed ingredients.

Because the composition of our invention contains Santoquin absorbed on natural vegetable material of small particle size and because the final composition has the form of dry, solid, particulate matter of small size, it is easily distributed evenly throughout animal feed and the Santoquin is readily available to act as an antioxidant and, in poultry feed, as an anti-encephalomalacia factor.

The following examples illustrate the novel process employed to produce the compositions of this invention:

*Example 1*

Eighty-five grams of corn cob meal (all passing a 30-mesh screen) was placed in a one-liter Pyrex glass beaker. Ten grams of 6-ethoxy-1,2-dihydro-2,2,4-trimethylquinoline was poured onto the corn cob meal and mixed well with a spatula to produce a mass having a shiny, oily appearance. Then 5 grams of finely ground talc (magnesium silicate) was added and mixed with the spatula to yield 100 grams of a non-oily, free-flowing product suitable for incorporation in animal feed. This product contained 10% by weight of 6-ethoxy-1,2-dihydro-2,2,4-trimethylquinoline.

*Example 2*

In a laboratory model Patterson-Kelley Twin Shell blender was placed 1.2 pounds of finely ground oat hulls (Cell-Flo). One-half pound of Santoquin (6-ethoxy-1,2-dihydro-2,2,4-trimethylquinoline) was added, and the blender was revolved for 10 minutes, with the intensifier bar operating to assist in obtaining a well-mixed product. The blender was stopped, 0.3 pound of synthetic hydrated calcium silicate in the form of Micro-Cel E was added, and the blender was again operated for 10 minutes. The mixed product was withdrawn from the blender and was found to be a non-dusty, free-flowing material very suitable for use as an ingredient in poultry and livestock feed. This product had the composition:

| | Percent |
|---|---|
| Finely-ground oat hulls | 60 |
| 6-ethoxy-1,2-dihydro-2,2,4-trimethylquinoline | 25 |
| Micro-Cel E | 15 |

*Example 3*

In a feed mixer was placed 26 lb. of finely-ground oat hulls (Q.O. Cellulose 20) and 50 lb. of Santoquin (6-ethoxy-1,2-dihydro-2,2,4-trimethylquinoline). These two ingredients were thoroughly mixed together, yielding a somewhat pasty mass which had a glistening, oily surface. Eight lb. of Micro-Cel was added and the mixer was operated for 5 minutes. It was then stopped and the contained mass was found to have lost its oily appearance. An additional 8 lb. of Micro-Cel was added and mixed for 5 minutes. The mass was examined and found to be better dispersed than before. A third addition of 8 lb. of Micro-Cel was then made and a further 15 minutes of mixing was performed. The resulting final product was collected and was found to be a dry, free-flowing material suitable for use in animal feed. It contained 26% finely-ground oat hulls, 50% Santoquin (6-ethoxy-1,2-dihydro-2,2,4-trimethylquinoline) and 24% hydrated calcium silicate (Micro-Cel). The product had a bulk density of about 22 lb. per cubic foot. The product was mixed with a poultry broiler feed and was observed to mix easily and to distribute well in the feed.

To test whether this 50% Santoquin product would bleed oil onto paper containers, 25 grams of the product were placed in a 4½-inch by 7-inch paper sample envelope and placed under a 50-pound weight for one week. At the end of this test period there were no oily spots on the paper, showing that the product was stable and non-bleeding. (Bleeding, greasy materials will stain the paper when subjected to this test.)

*Example 4*

In a laboratory beaker 70 grams of 6-ethoxy-1,2-dihydro-2,2,4-trimethylquinoline was mixed with 10 grams of ground dried beet pulp of particle size smaller than 30 mesh. There were then added, with mixing, four 5-gram increments of synthetic hydrated calcium silicate, to yield, after thorough mixing, a flowable powder which could be conveyed in dry, solid form and mixed with other solid components of animal feed.

It is possible to produce a mixture of Santoquin and mineral powder which, while not equivalent to heretofore mentioned substances, provides a product of certain desirable characteristics. For example, a substance containing about 60 to 70% Santoquin and from 30 to 40% synthetic hydrated calcium silicate without the presence of vegetable powder is of a substantially stable non-bleeding, non-greasy and flowable nature. The mixing procedures employed in the production of these products are essentially the same as heretofore described, without, of course, the vegetable material mixing step.

Although the invention has been described with reference to a particular additive composition and with reference to specific vegetable and mineral materials, it will be understood that the process is applicable to other ingredients, and that other equivalent vegetable and mineral compositions are contemplated.

It will be understood that changes may be made in the above disclosed process and in the product formulations in a manner to provide the characteristics of this invention, without departing from the spirit thereof, particularly as defined in the following claims.

We claim:

1. A feed grain additive consisting essentially by weight of from 10–70% of 6-ethoxy-1,2-dihydro-2,2,4-trimethylquinoline, 1–88% absorptive vegetable matter characterized by a fiber content of at least 19%, and 2–30% absorptive mineral powder.

2. A composition of matter consisting essentially by weight of from 10–70% of 6-ethoxy-1,2-dihydro-2,2,4-trimethylquinoline, 1–88% absorptive vegetable matter characterized by a fiber content of at least 19%, and 2–30% absorptive mineral powder selected from the group consisting of the natural and synthetic silicates of calcium and magnesium.

3. The composition of matter as claimed in claim 1 containing about 10% 6-ethoxy-1,2-dihydro-2,2,4-trimethylquinoline, about 80–88% of said vegetable matter and about 2–10% of said mineral powder.

4. The composition of matter as claimed in claim 1 containing about 25% 6-ethoxy-1,2-dihydro-2,2,4-trimethylquinoline, about 55–70% of said vegetable matter and about 5–20% of said mineral powder.

5. The composition of matter as claimed in claim 1 containing about 50% 6-ethoxy-1,2-dihydro-2,2,4-trimethylquinoline, about 20–42% of said vegetable matter and about 8–30% of said mineral powder.

6. The composition of matter as claimed in claim 1 containing about 70% 6-ethoxy-1,2-dihydro-2,2,4-trimethylquinoline, about 1–20% of said vegetable matter and about 10–29% of said mineral powder.

7. The composition of matter according to claim 2 wherein said vegetable matter comprises finely ground oat hulls and said mineral powder comprises finely ground natural magnesium silicate.

8. The composition of matter according to claim 2 wherein said vegetable matter comprises finely ground oat hulls and said mineral powder comprises synthetic hydrated calcium silicate.

9. The method of preparing dry particulate animal feed supplement containing from 10–70% by weight of 6-ethoxy-1,2-dihydro-2,2,4-trimethylquinoline comprising the steps of mixing said compound with an absorptive vegetable material containing at least 19% fiber until an oily, pasty, semi-solid mass is formed; adding to this mass an absorptive powder of mineral origin selected from the group consisting of the natural and synthetic silicates of calcium and magnesium and mixing the resulting combination until a dry composition is formed.

10. The method according to claim 9 wherein the vegetable matter is added in an amount from about 1–88% by weight and said mineral powder is added in an amount from about 2–30% by weight.

11. The process according to claim 9 wherein the vegetable matter is corn cob meal and the mineral powder is talc.

12. The process according to claim 9 wherein the vegetable matter is comprised of finely ground oat hulls and the mineral powder is hydrated calcium silicate.

13. The process according to claim 9 wherein the vegetable matter is ground dried beet pulp and the mineral powder is hydrated calcium silicate.

14. The method of preparing dry particulate animal feed supplement containing from 10–70% by weight of 6-ethoxy-1,2-dihydro-2,2,4-trimethylquinoline comprising the steps of mixing said compound with an absorptive vegetable material containing at least 19% fiber until an oily, pasty, semi-solid mass is formed; adding an amount of an absorptive mineral powder; mixing the resulting combination until said oily appearance is lost; interrupting the mixing and adding additional amounts of said mineral powder, remixing said combination until substantial dispersion of said ingredients is achieved; interrupting said remixing and adding further amounts of said mineral powder; and finally mixing said combination until a dry composition is formed.

References Cited in the file of this patent

UNITED STATES PATENTS

| 2,777,797 | Hochberg | Jan. 15, 1957 |
| 2,858,215 | Espoy | Oct. 28, 1958 |
| 2,897,119 | Dunn | July 28, 1959 |